United States Patent [19]

Yatka et al.

[11] Patent Number: 4,986,991

[45] Date of Patent: Jan. 22, 1991

[54] CHEWING GUM HAVING AN EXTENDED SWEETNESS

[75] Inventors: Robert Yatka, Orland Park; Patrick Prombo, Homewood; Roman M. Barabolak, Westchester; Steven Zibell, Palos Heights; Gordon N. McGrew, Evanston, all of Ill.

[73] Assignee: Wm Wrigley, Jr., Company, Chicago, Ill.

[21] Appl. No.: 376,037

[22] Filed: Jul. 5, 1989

Related U.S. Application Data

[63] Continuation-in-part of Ser. No. 50,534, May 15, 1987, abandoned, and a continuation-in-part of Ser. No. 50,626, May 15, 1987, abandoned, and a continuation-in-part of Ser. No. 50,627, May 15, 1987, abandoned.

[51] Int. Cl.$^5$ .............................................. A23G 3/30
[52] U.S. Cl. .................................... 426/3; 426/548; 426/658; 426/804; 424/48; 424/49; 424/53; 536/122
[58] Field of Search ..................................... 426/3-6, 426/548, 658, 804; 424/48, 49, 53; 536/122

[56] References Cited

U.S. PATENT DOCUMENTS

| | | |
|---|---|---|
| 3,746,554 | 7/1973 | Endicott . |
| 3,943,258 | 3/1976 | Bahoshy et al. . |
| 3,982,023 | 9/1976 | Bahoshy et al. . |
| 4,036,992 | 7/1977 | Bahoshy et al. . |
| 4,228,198 | 10/1980 | Burge et al. . |
| 4,246,286 | 1/1981 | Klose et al. . |
| 4,292,336 | 9/1981 | Latymer ............................ 426/804 |
| 4,343,934 | 8/1982 | Jenner et al. . |
| 4,380,476 | 4/1983 | Mufti et al. . |
| 4,384,004 | 5/1983 | Cea et al. . |
| 4,389,394 | 6/1983 | Drucker . |
| 4,405,654 | 9/1983 | Lee . |
| 4,435,440 | 3/1984 | Hough et al. . |
| 4,457,921 | 7/1984 | Stroz et al. . |
| 4,473,546 | 9/1984 | Jackson et al. . |
| 4,495,170 | 1/1985 | Beyts et al. . |
| 4,508,713 | 4/1985 | Stroz et al. . |
| 4,549,013 | 10/1985 | Hough et al. . |
| 4,612,373 | 9/1986 | Khan et al. . |
| 4,664,906 | 5/1987 | Sipos . |
| 4,738,854 | 4/1988 | Friello et al. . |
| 4,820,528 | 4/1989 | Stroz et al. ............................ 426/96 |

FOREIGN PATENT DOCUMENTS

| | | |
|---|---|---|
| 0220907 | 5/1987 | European Pat. Off. . |
| 0267809 | 5/1988 | European Pat. Off. . |
| 0289462 | 11/1988 | European Pat. Off. . |
| 8808671 | 11/1988 | PCT Int'l Appl. . |
| 2065648 | 7/1981 | United Kingdom . |
| 2153651 | 8/1985 | United Kingdom . |
| 2154850 | 9/1985 | United Kingdom . |
| 2169601 | 7/1986 | United Kingdom . |
| 2181734 | 4/1987 | United Kingdom . |
| 2185674 | 7/1987 | United Kingdom . |

OTHER PUBLICATIONS

Waldholz, "Johnson & Johnson Seeks Approval . . . ", *Wall Street Journal*, Feb. 12, 1987.
"A New Intensive Sweetner", Reach Associations, Inc., date unknown.
Levine, *Pharmacology, Drug Actions & Reactions*, pp. 206-207, & 215, 1973.
Hough et al., "Enhancement in the Sweetness of Sucrose", *Nature*, vol. 263, Oct. 28, 1976.
Hough et al., eds., *Developments in Sweetners*, vol. 1, pp. 37 & 172, 1979, vol. 2, pp. 149-151, 1983.
Alberty, *Physical Chemistry*, 6th Ed., pp. 602-603 & 608-609, 1983.

*Primary Examiner*—Jeanette Hunter
*Attorney, Agent, or Firm*—Willian Brinks Olds Hofer Gilson & Lione

[57] ABSTRACT

A chewing gum composition having an extended sweetness and flavor comprising a chewable gum base and a sweetener comprising 4,1',6'-trichloro-4,1',6'-trideoxygalactosucrose (TGS), also known as sucralose. the gum base preferably comprises polyvinyl acetate, wax, and fats and oils. Within the initial 2 minutes of chewing, the TGS releases from said gum at a rate less than about 8 sucrose equivalents per minute, and at about 10 minutes of chewing, said TGS releases from said gum at a rate greater than about 3 sucrose equivalents per minute. To improve sweetness and flavor balance, a portion of the TGS is modified to make it fast releasing or a fast release sweetener is added to the chewing gum. The chewing gum is manufactured by mixing chewing gum ingredients including the chewable gum base and the sweetener in any conventional manner.

24 Claims, 3 Drawing Sheets

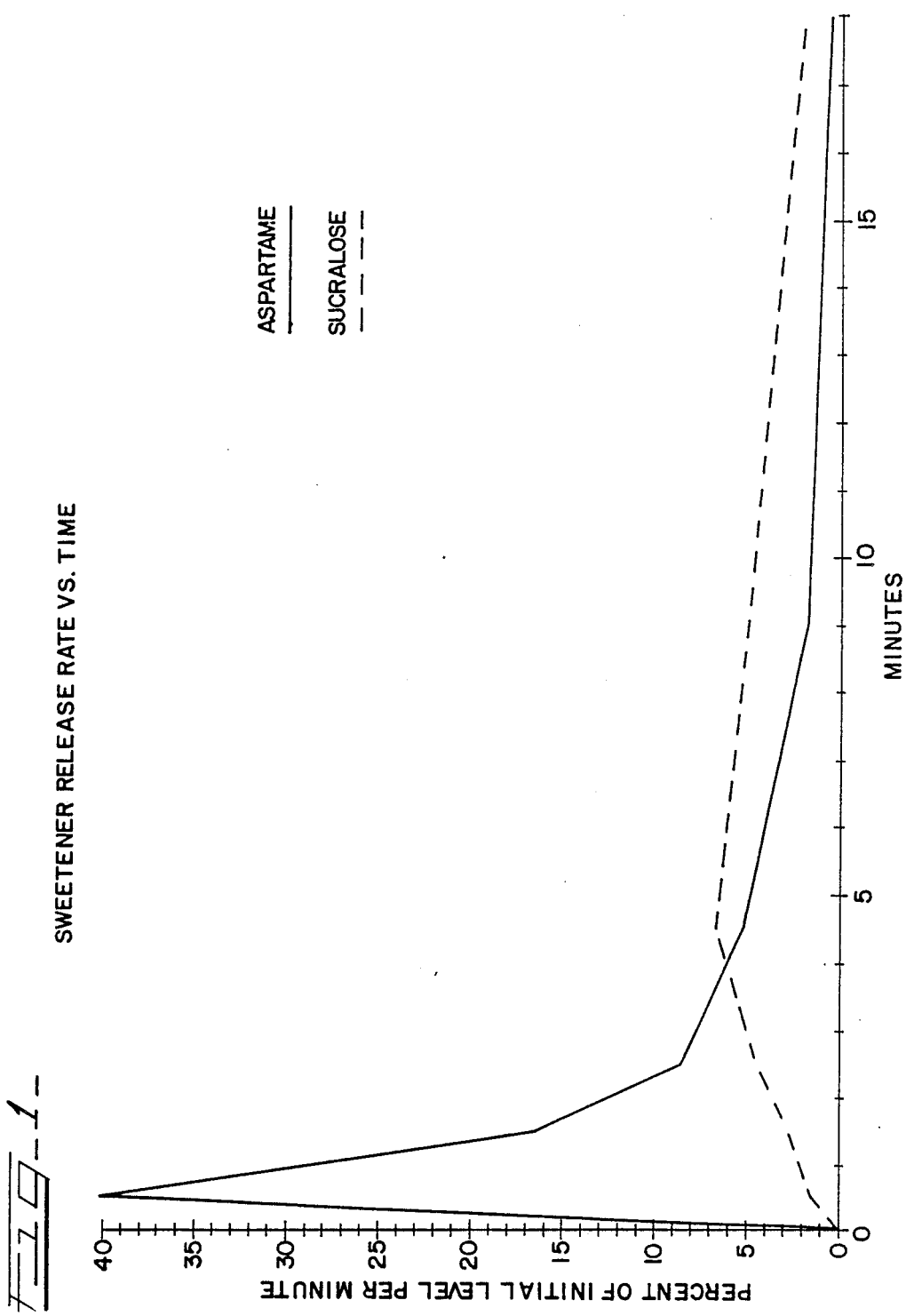

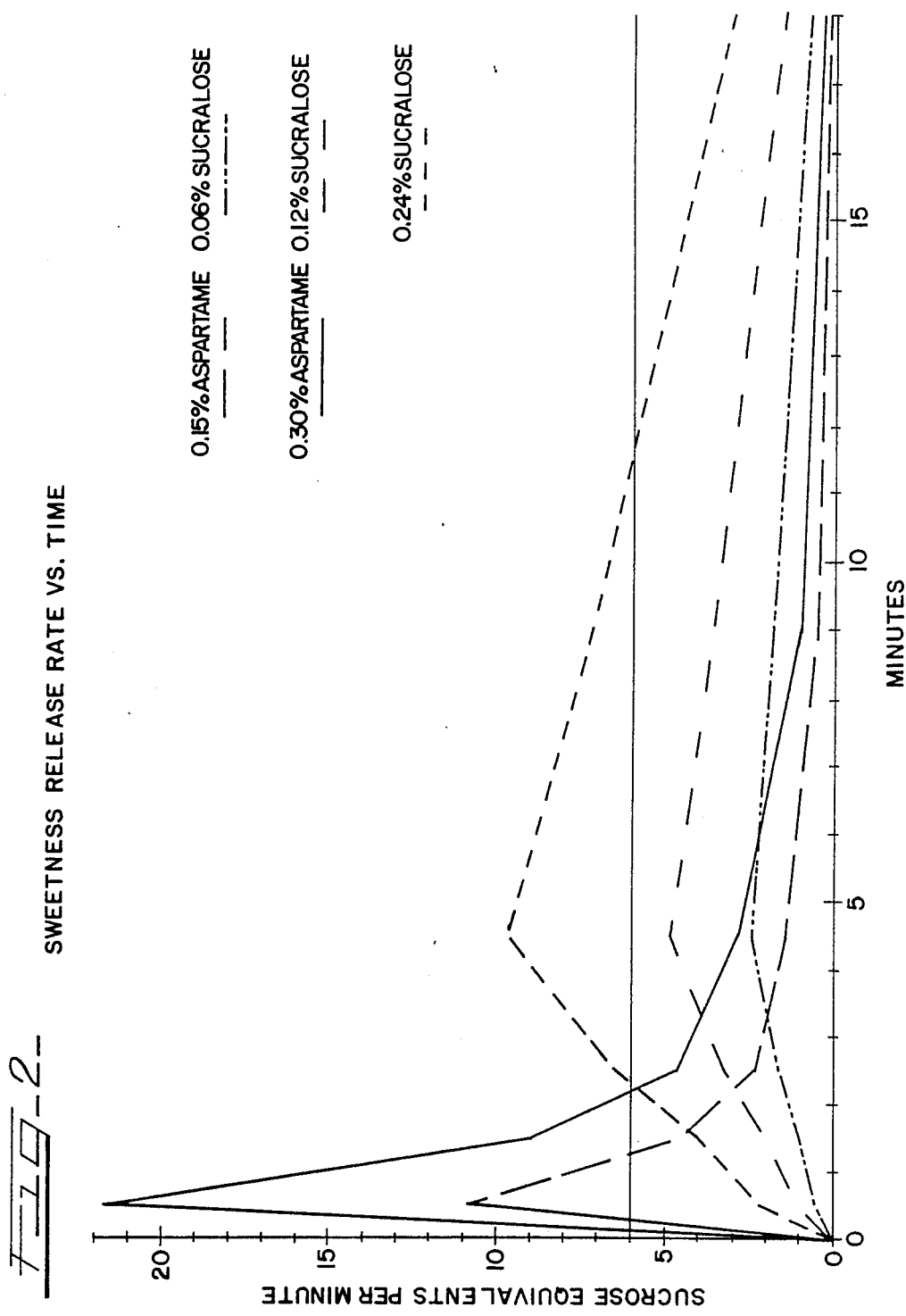

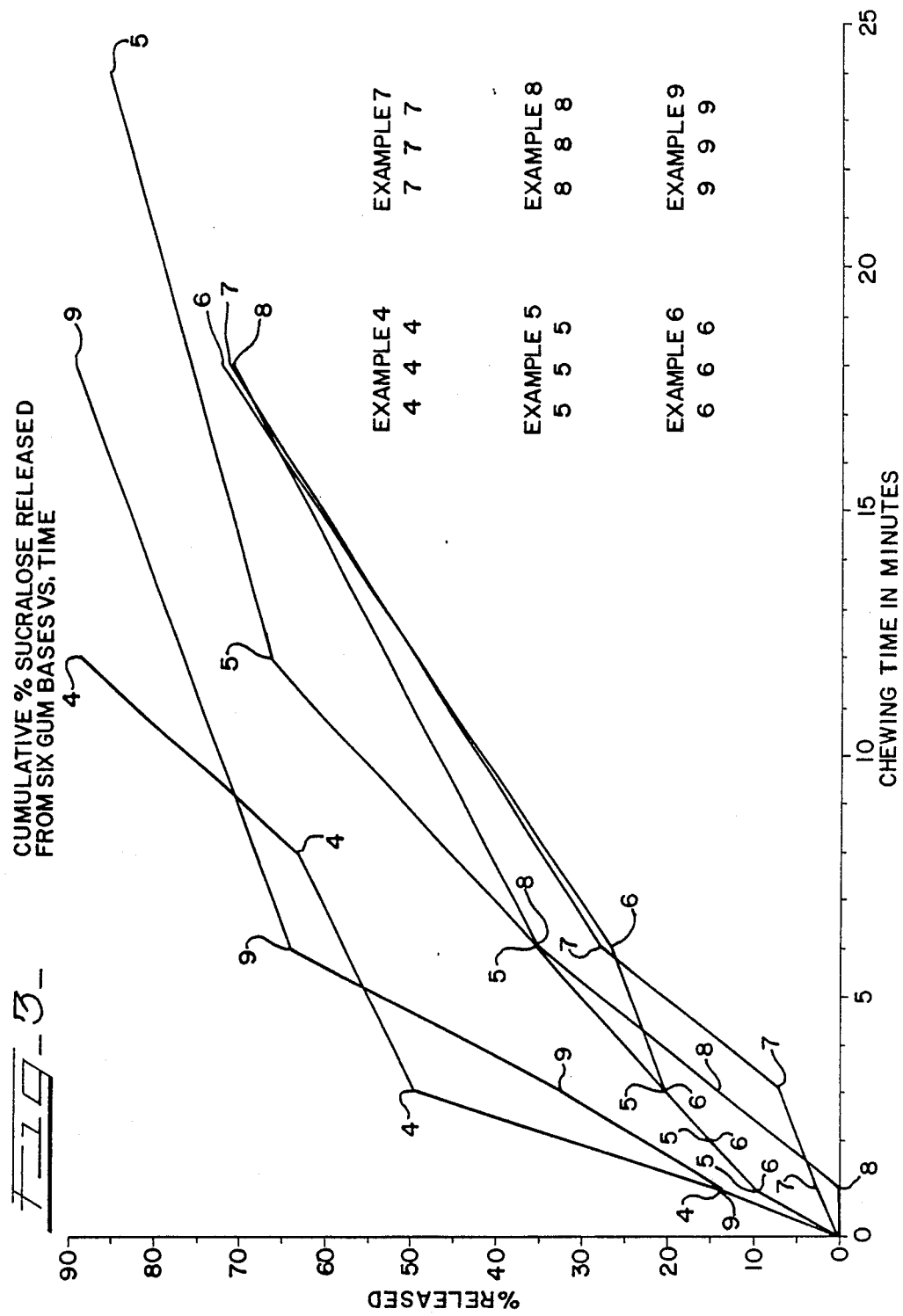

CHEWING GUM HAVING AN EXTENDED SWEETNESS

CROSS REFERENCE TO RELATED APPLICATION

This application is a continuation in part of U.S.S.N. 050,534 filed May 15, 1987, now abandoned U.S.S.N. 050,626 filed May 15, 1987, now abandoned and U.S.S.N. 050,627 filed May 15, 1987 now abandoned.

FIELD OF THE INVENTION

The present invention relates to chewing gum compositions containing sucralose having an extended release of sweetness and methods of their manufacture.

BACKGROUND OF THE INVENTION

Chewing gums comprise many ingredients including sweeteners. Sweeteners suitable for chewing gums include both natural and artificial sweeteners. Recently, the high intensity artificial sweeteners have been the focus of investigation for use in chewing gum.

High intensity sweeteners may be hundreds of times sweeter than natural sweeteners such as sucrose and glucose. High intensity sweeteners of recent interest include aspartame, acesulfame K, cyclamates, saccharin, and now sucralose. Sucralose is a new high intensity sweetener which is a tri-chlorinated sucrose derivative and is about 600 times sweeter than sucrose. Sucralose has been reported to be much cheaper than aspartame and at least 3 times sweeter. Compared to some other high intensity sweeteners, sucralose has a sweet taste more similar to sucrose. Chemically, sucralose is known as 4,1',6'-trichloro-4,1',6'-trideoxy-galactosucrose, or alternatively 1,6-dichloro-1,6-dideoxy-($\beta$)-D-fructofuranosyl 4-chloro-4-deoxy-($\alpha$)-D-galactopyranoside. In addition, sucralose is also referred to in short from as TGS. Its use to sweeten substances including oral compositions is disclosed in U.S. Pat. Nos. 4,343,934 and 4,389,394 which are incorporated herein by their reference.

One of the limitations of chewing gum is that the sweetness and flavor are rapidly lost during chewing. Thus, chewing gum producers are constantly trying to extend the time in which a consumer of chewing gum can enjoy its flavor and sweetness.

It is known that the sweetness and flavor can be extended in chewing gum by using high levels of high intensity sweeteners such as aspartame, saccharin and cyclamate. The extension properties of those sweeteners, however, are limited by their release characteristics during chewing of the gum. Providing a chewing gum having improved sweetness and flavor extension is one object of this invention.

It is also often desirable to produce a chewing gum having a rapid release of sweetness and flavor upon chewing. The flavor and sweetness of fast release chewing gums, however, dissipates quickly during chewing. Thus, the consumer who desires an initial sweetness impact during chewing must sacrifice the enjoyment of long lasting sweetness and flavor. Similarly, the consumer who desires a chewing gum having a longer lasting sweetness and flavor must forego the sensation of an initial sweetness impact. Providing a chewing gum having improved sweetness and flavor extension in combination with an initial sweetness impact upon chewing is a further object of this invention.

SUMMARY OF THE INVENTION

According to the present invention, it has been found that chewing gums containing sucralose and various gum base formulations have unique sucralose release rates during chewing and improved sweetness and flavor extension properties. Furthermore, sweetness and flavor balance can be improved by modifying the release of a portion of the sucralose to make it fast releasing during chewing or including a fast release sweetner in the chewing gum.

In accordance with one embodiment, the present invention provides a chewing gum composition comprising sucralose and a chewable gum base containing polyvinyl acetate, wax, and fats and oils.

In accordance with another embodiment the present invention provides a chewing gum composition comprising a chewable gum base and a sweetener comprising sucralose in an amount such that within the initial 2 minutes of chewing, said sucralose releases from said gum at a rate less than about 8 sucrose equivalents per minute, and at about 10 minutes of chewing, said sucralose releases from said gum at a rate greater than about 3 sucrose equivalents per minute.

In accordance with a further embodiment, the present invention provides a chewing gum composition comprising a mixture of chewing gum ingredients comprising at least a chewable gum base and a sweetener comprising sucralose and a fast release sweetner This chewing gum has both an initial impact of sweetness and a longer lasting sweetness.

In accordance with a still further embodiment, the present invention provides a chewing gum composition comprising a mixture of chewing gum ingredients comprising at least a chewable gum base and a sweetener comprising sucralose wherein at least a portion of said sucralose is treated to act as a fast release sweetener. This chewing gum also has both an initial impact of sweetness and a longer lasting sweetness.

In still yet another embodiment the present invention provides a method of manufacturing a chewing gum composition comprising a mixture of chewing gum ingredients comprising at lest a chewable gum base containing polyvinyl acetate, wax, and fats and oils, and a sweetener comprising sucralose. The method comprises adding the sucralose to the chewing gum mixture in an amount such that within the initial 2 minutes of chewing, said sucralose releases from said gum at a rate less than about 8 sucrose equivalents per minute, and at about 10 minutes of chewing, said sucralose releases from said gum at a rate greater than about 3 sucrose equivalents per minute.

In accordance with another embodiment the present invention provides a method for producing a chewing gum composition comprising a mixture of chewing gum ingredients comprising at least a chewable gum base and a sweetener comprising a sucralose and a fast release sweetener. The method comprises mixing the sucralose, the fast release sweetener, and the chewable gum base with the chewing gum mixture to obtain the chewing gum composition. The chewing gum composition has both an initial impact of sweetness.

In accordance with a further embodiment the present invention provides a method for producing a chewing gum composition comprising a mixture of chewing gum ingredients comprising at least a chewable gum base and a sweetner comprising sucralose wherein at least a portion of said sucralose releases from the chewing gum at a increased rate during chewing. The method comprises the steps of first dissolving at least a portion of said sucralose in a food acceptable solvent or water and then adding the dissolved sucralose to the chewing gum mixture to obtain the chewing gum composition.

In accordance with yet a further embodiment the present invention provides a method for producing a chewing gum composition comprising a mixture of chewing gum ingredients comprising at least a chewable gum base, flavor, and a sweetner comprising sucralose wherein at least a portion of the sucralose releases from the chewing gum at an increased rate during chewing. The method comprises first dissolving at least a portion of the sucralose in a food acceptable solvent or water. The dissolved sucralose is then added to the flavor to obtain a blend of sucralose and flavor. The blend of sucralose and flavor is then added to the chewing gum mixture to obtain the chewing gum composition.

In accordance with still another embodiment the present invention provides a method for producing a chewing gum composition comprising a mixture of chewing gum ingredients comprising at least a chewable gum base, flavor, and a sweetner comprising sucralose wherein at least a portion of said sucralose releases from the chewing gum at an increased rate during chewing. The method comprises first dissolving at least a portion of the sucralose in the flavor. The sucralose in flavor solution is then added to the chewing gum mixture to obtain the chewing gum composition.

In accordance with yet another embodiment the present invention provides a chewing gum composition comprising a mixture of chewing gum ingredients comprising at least a chewable gum based and a sweetener comprising sucralose wherein at least a portion of the sucralose releases from the chewing gum at an increased rate during chewing. The chewing gum is prepared by first modifying at least a portion of the sucralose such that the portion releases from the chewing gum at an increased rate during chewing. The modified sucralose is then added to the chewing gum mixture to obtain the chewing gum composition.

In accordance with still yet another embodiment the present invention provides a method for producing a chewing gum composition comprising a mixture of chewing gum ingredients comprising at least a chewable gum base and a sweetener comprising sucralose wherein at least a portion of the sucralose with a water soluble compound. The encapsulated sucralose is then added to the chewing gum mixture to obtain the chewing gum composition.

In accordance with a further embodiment the present invention provides a method for producing a chewing gum composition comprising a mixture of chewing gum ingredients comprising at least a chewable gum base and a sweetener comprising sucralose wherein at least a portion of the sucralose releases from the chewing gum during chewing at an increased rate during chewing. The method comprises the steps of first co-drying the sucralose with a water soluble compound. The co-dried sucralose is then added to the chewing gum mixture to obtain the chewing gum composition.

Other embodiments not mentioned herein but which incorporate the spirit of the invention will be apparent to those skilled in the art in light of the present disclosure and are therefore also contemplated.

The sucralose containing chewing gum of the present invention, when chewed, releases its ingredients in a manner which yields a desirable balance of extended sweetness and flavor. The sucralose containing chewing gum of the present invention also has a more overall intense sweetness than heretofore known and gives an early burst of sweetness and flavor when initially chewed, but also maintains its sweetness and flavor for extended chewing periods.

These and other advantages of the present invention will become apparent from the following description, which, when taken in conjunction with the accompanying drawings discloses presently preferred exemplary embodiments of the present invention. It should be understood that this description is illustrative rather than limitative, the scope of the present invention being defined by the appended claims.

BRIEF DESCRIPTION OF THE DRAWINGS

A presently preferred exemplary embodiment of the invention summarized above is illustrated in the accompanying drawings.

FIG. 1 is a plot of the release rates of two sweeteners as a function of time. The release rate is expressed as a percentage of the initial level released per minute.

FIG. 2 is a plot of sweetness release rate from chewing gum containing the two sweeteners at various levels as a function of time. The sweetness release is expressed in sucrose equivalents per minute.

FIG. 3 is a plot of cumulative percent of sucralose released from six different gum bases as a function of time.

DETAILED DESCRIPTION OF PRESENTLY PREFERRED EMBODIMENTS

As their name implies, artificial sweeteners are sweetening compounds not naturally found. Artificial sweeteners are synthesized from a wide variety of materials, and thus have various properties and physical structures.

For example, aspartame is a dipeptide sweetener prepared from the amino acids aspartic acid and phenylalanine. On the other hand, saccharin is a benzithiazol compound prepared from toluene sulfonic acid. Though these compounds exhibit similar sweetness characteristics, they differ in other properties such as solubility, stability, and secondary sensory properties. Sucralose also is unique in its source and characteristics. In fact, sucralose is the only commercially promising high intensity sweetener which is a synthetic derivative of sucrose, a natural sugar.

FIG. 1 illustrates and compares release rates of aspartame and sucralose from chewing gum during chewing. The values represented in FIG. 1 were obtained by having subjects chew pieces of gum containing the sweetener and analyzing the cud after various chewing intervals. The amount of sweetener remaining in the cud was then analytically determined. The release rate is expressed as a percent of the starting concentration of the sweetener released per minute. (For example: If a piece of gum initially contains 10 mg. of aspartame, at its peak release rate [40% per minute] it would release aspartame at a rate of 10 mg×40% per minute=4 mg/min.) Tests have shown that both sweeteners follow the respective rate curves depicted over a wide range of starting concentrations in the gum.

From the figure it can be seen that sucralose more closely approximates a constant release rate than aspartame during chewing.

It has been found that the extension properties of high intensity sweeteners such as aspartame, saccharin and cyclamate are limited by their release characteristics during chewing of the gum. As shown in FIG. 1, a substantial amount of the aspartame present in chewing gum is released during the early chewing period. Thus, as evidenced by the peak produced during the first few minutes of chewing, aspartame is released rapidly at first but much more slowly later on. This is because the aspartame is depleted by its rapid early release during the initial chewing period. Note that the peak aspartame release rate occurs at about 0.5 minutes.

It has been found that all other tested high and low intensity sweeteners either exhibit release characteristics similar to aspartame or, such as in the case of thaumatin or monellin, display virtually no release characteristics. Sucralose, however, has been found to possess exceptional release characteristics, releasing much more slowly during the initial period than aspartame but reaching a desirable peak release at about 4.5 minutes.

FIG. 2 illustrates projected physiological sweetness responses to chewing gums having various levels of the sweeteners sucralose and aspartame. FIG. 1, on the other hand, depicts the physical release rate of the respective sweeteners. The release of sweetness from chewing gums may be expressed in sucrose equivalents per minute. As used herein, a sucrose equivalent is a unit of sweetening power equal to the sweetening power present in a chewing gum containing 1 weight percent sucrose. Thus, since sucralose is about 600 times sweeter than sucrose, about 0.0017 weight percent sucralose provides one sucrose equivalent. Thus, the release of .0017 weight percent sucralose from chewing gum per minute is equal to the release of 1 sucrose equivalent per minute.

FIG. 2 compares sweetness release rates during chewing from chewing gum containing various levels of aspartame and sucralose. The sweetness release in FIG. 2 is expressed in sucrose equivalents per minute. Thus, for example, at a value of 10 sucrose equivalents per minute, the chewing gum is releasing sweetness theoretically equivalent to a sucrose sweetened gum releasing sucrose at a rate of 10 percent by weight of the gum per minute. The sweetness contributed by the artificial sweetener is in addition to that contributed by any sweet bulking agent which may be present at significant levels early in the chewing period. The values represented in FIG. 2 assume that sucralose is 600 times sweeter than sucrose and that aspartame is 180 times sweeter than sucrose at all usage levels.

Because the scale is a measure of absolute sweetness at any point during chewing, the different sweetener curves can be compared directly to each other. According to FIG. 2, to achieve a significantly greater sweetness extension, one must add large quantities of aspartame. But, as more aspartame is added, its release characteristics during the first few minutes of chewing, cause an extremely high initial release of sweetness. Thus, as increased amounts of aspartame are added to achieve greater sweetness extension, the amount of aspartame released during the initial chewing period will be too high, and the chewing gum may cause discomfort to the consumer and be rejected. In addition, sweetness and flavor will be out of balance during the early chewing period, giving the consumer further reason for rejecting the chewing gum. Furthermore, the additional cost of increased quantities of aspartame are prohibitive.

Sucralose, however, has been found to have a flatter or more uniform release rate over time. As depicted in FIG. 2, sucralose gradually releases during the early chewing period. The consumer therefore experiences a more consistent release of high intensity sweetener over time resulting in a better balance of sweetness and flavor during chewing. Thus, as shown in FIG. 2, surprisingly large amounts of the high intensity sweetener, sucralose, can be added to a chewing gum without causing discomfort to the consumer and rejection of the chewing gum. As an added advantage, FIG. 2 illustrates that a greater sWeetness extension than heretofore known is also achieved in chewing gum. Further, a chewing gum comprising sucralose in amounts contemplated by the present invention will yield a chewing gum having a more constant release of high intensity sweetener. Therefore, manufacturers will be able to produce a chewing gum which will more closely approximate a constant sweetness level over time.

For example, if one wanted to produce a chewing gum having a 6 sucrose equivalent per minute release rate over an approximate 18 minute period, he may prepare a chewing gum comprising about 0.24 weight percent sucralose. From FIG. 2, it can be seen that the release curve of a chewing gum containing 0.24 weight percent sucralose intersects a constant sucrose equivalent release curve of 6 at about 2 minutes and about 12 minutes. Further, the maximum sucrose equivalent release rate from the 0.24% gum is never greater than 10 per minute, nor does it drop below 3 sucrose equivalents until after the 18 minute chewing period. On the other hand, a chewing gum containing 0.30 weight percent aspartame intersects the constant sucrose equivalent release curve of 6 at about one-eighth of a minute or about 7.5 seconds, and then again at about 2.25 minutes. Further, the maximum sucrose equivalent release rate of aspartame of about 22 occurs in less than one minute, and drops to about 0.5 by 15 minutes.

When employed in chewing gum formulations, the reason why sucralose possesses these unique release characteristics is not fully understood. For example, because of its relatively high water solubility, it might be expected that sucralose would quickly dissipate during chewing. Surprisingly, however, it has been found that sucralose does not provide significant early sweetness during the initial chewing period but instead provides a sustained release of sweetness and flavor during chewing in chewing gums. Without being limited to theory, it is believed that the particular release characteristics of sucralose are due at least in part to the compound's unique affinity to the chewing gum base or gum base ingredients.

Even though gums containing sucralose exhibit greater sweetness extension properties than heretofore known, it is also desirable to provide a gum which quickly releases sweetness immediately upon chewing.

It has also been found that when powdered sucralose is combined with a sweetener which releases during the initial chewing period, a better balance of sweetness and flavor over an extended chewing period is experienced by the consumer.

It has further been found that by dissolving sucralose in a food acceptable solvent or water prior to its admixture with other gum constituents, the release rate of the sucralose in the chewing gum can be increased during the initial chewing period. It is not understood exactly why dissolution of sucralose prior to its admixture effects its release in chewing gum, but this phenomenon is believed to be related to the compound's unique chemical properties.

It has also been found that the release rate of sucralose during the initial chewing period can be increased by adding it to gum in an encapsulated or co-dried form. In particular, the release rate of sucralose can be increased by encapsulating at least a portion of the high intensity sweetener in a water soluble encapsulant. Alternatively, the sucralose can be spray dried or otherwise co-dried with water soluble compounds. Increasing the release rate of sucralose in this manner allows the consumer to experience a better balance of sweetness and flavor throughout the early chewing period.

Further, since sucralose also possesses sweetness extension properties, powdered forms of sucralose can be used in combination with sucralose which has been encapsulated, co-dried, or dissolved in a solvent to produce a chewing gum having both an initial intense release of flavor and sweetness and an extended release of sweetness and flavor throughout chewing.

These advantages have been made possible by the present invention disclosed herein. Other advantages realized from the present invention, not mentioned but which will be readily apparent to those skilled in the art in view of the instant disclosure are also contemplated.

In one embodiment, the present invention contemplates a chewing gum comprising sucralose in an amount such that within the initial 2 minutes of chewing, the sucralose releases from the gum at a rate less than about 8 sucrose equivalents per minute. At a sucrose equivalent above 8, the sweetness from a sweetener in combination with that from a bulking agent or other sweeteners present in the gum may result in a total sweetness level so high as to cause discomfort. At a sucrose equivalent at about 8, the amount of sucralose released, however, will not be so high as to cause the consumer to reject the chewing gum. Further, at this level, the consumer will experience a desirable balance of sweetness and flavor.

In accordance with another embodiment of the present invention, there is provided a chewing gum comprising sucralose in an amount such that at about 10 minutes of chewing, the sucralose releases from the gum at a rate greater than about 3 sucrose equivalents per minute. In accordance with this embodiment, chewing gums possessing sucralose in the amount contemplated exhibit a more uniform release rate of sweetener over time as well as a greater sweetness extension than heretofore known. Preferably, in order to exhibit an even greater sweetness extension, the chewing gum of the present invention will comprise sucralose in an amount such that at about 15 minutes of chewing, the sucralose releases from the gum at a rate greater than about 1.5 sucrose equivalents per minute.

At a sucrose equivalent less than about 1, it is believed that sweetness is not perceived by most consumers of gum. Preferably, sweetness is best perceived above a sucrose equivalent of about 2. However, those skilled in the art will understand that the degree of sweetness perception varies greatly depending upon the individual consumer.

In accordance with yet another embodiment, the present invention contemplates a chewing gum comprising sucralose in amounts greater than 0.07 weight percent. Preferably, the chewing gum will comprise sucralose in an amount between about 0.07 and about 0.40 weight percent. Chewing gum, in accordance with this embodiment, exhibits the advantages described above.

In accordance with still a further embodiment, the present invention contemplates a chewing gum comprising greater than about 0.07 weight percent sucralose and between about 10 and about 50 weight percent chewable gum base. The present invention contemplates a gum base comprising between about 5 and 40 weight percent polyvinyl acetate, 7 and 30 weight percent wax, and 0 and 20 weight percent fats and oils.

In general, a chewing gum composition comprises a water soluble bulk portion and a water insoluble chewable gum base portion and, typically water insoluble flavoring agents. The water soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobuylene-isoprene copolymer, styrene butadiene rubber as well as natural latexes such a chicle. Resins include polyvinylacetate and terpene resins. Low molecular weight polyvinyl acetate is a preferred resin. Fats and oils may also be included in the gum base, including animal fats such as lard and tallow, vegetable oils such as soybean and cottonseed oils, hydrogenated and partially hydrogenated vegetable oils, and coca butter. Commonly employed waxes include petroleum waxes such as paraffin and microcrystaline, natural waxes such as beeswax, candellia, carnuba and polyethylene. Preferably, the waxes have a melting point between 95° F. and 240° F.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors, and emulsifiers.

According to the present invention, the insoluble gum base constitutes between about 5 to 95 weight percent of the gum. Preferably the insoluble gum base comprises about 10 to about 50 weight percent of the gum and more preferably about 25 to about 35 weight percent.

The art has not investigated sweetener release as a function of gum base composition. It has been found, however, that polyvinyl acetate, wax, and fats and oils have a unique effect on the release rate of sucralose. Fillers and elastomers appear to have a minor effect while emulsifiers, softeners, ester gums, terpene resins and natural gums are believed to have no effect on sucralose release. The following table lists these gum base components and preferred formulations by weight percent of gum base.

| Component Base | Weight Percent of Gum |
|---|---|
| Polyvinyl Acetate | 5–40 |
| Wax | 7–30 |
| Fats and Oils | 0–20 |
| Filler | 7–50 |
| Elastomer | 5–20 |
| Emulsifiers/Softeners | 0–10 |
| Ester Gums/Terpene Resins | 0–40 |

| Component Base | Weight Percent of Gum |
| --- | --- |
| Natural Gums | 0–40 |

The water soluble portion of chewing gum may further comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 weight percent of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

Sweeteners contemplated by the present invention include both sugar and sugarless components. Sugar sweeteners generally include saccharide containing components commonly known in the chewing gum art which comprise but are not limited to sucrose, dextrose, maltose, dextrin, dried invert sugar, fructose, levulose, galactose, corn syrup solids, and the like, alone or in any combination. Sugarless sweeteners include components with sweetening characteristics but are devoid of the commonly known sugars and comprise but are not limited to sugar alcohols such as sorbitol, mannitol, xylitol, hydrogenated starch hydrolysates, maltitol, and the like, alone or in any combination. Also contemplated as sugarless sweeteners are any high intensity or artificial sweetener in addition to sucralose such as aspartame, salts of acesulfame, alitame, saccharin and its salts, cyclamic acid and its salts, dihydrochalcones, thaumatin, monellin, and the like, alone or in any combination. Further, those skilled in the art will recognize that any combination of sugar and/or sugarless sweeteners may be employed in the chewing gum. Further, those skilled in the art will recognize the sweetener may also function in the chewing gum in whole or in part as a water soluble bulking agent or softener. In addition, the softener may be combined with the sweetener such as in an aqueous sweetener solution.

Fast release sweeteners contemplated by the present invention include the low intensity sweeteners sucrose, dried invert sugar, fructose, xylitol, and combinations thereof. Fast release sweeteners also include most high intensity sweeteners including aspartame, acesulfame, alitame, saccharin, cyclamate, dihydrochalcones, alone or in any combination. Specifically excepted from this group are thaumatin and monellin which are considered to be slow release sweeteners. Further, those skilled in the art will recognize the low intensity sweeteners may also serve as bulking agents in the chewing gum in whole or in part. In addition, the softener may be combined with the low intensity sweeteners such as in an aqueous solution.

Fast release sweeteners contemplated by the present invention will release at least about 60% of their sweetness in the first five minutes of chewing. Further, fast release sweeteners will have sweetness intensity at least about equal to that of sucrose in order to provide a high impact of sweetness during the first three minutes of chewing. Thus, the high intensity sweeteners sucralose, thaumatin and monellin, and the low intensity sweeteners sorbitol, mannitol, dextrose, maltose, corn syrup solids, galactose, dextrin, hydrogenated starch hydrolysates, maltitol, isomaltitol, are not considered to be fast release sweeteners.

Fast release sweeteners may be found naturally, or they may be sweeteners which are treated such that they possess fast release properties. Sweeteners not considered fast release sweeteners are, of course, slow release sweeteners. However, those skilled in the art will understand that slow release sweeteners may also be present in the chewing gum. Thus, slow release sweeteners such as sorbitol, mannitol, dextrose, corn syrup solids and ydrogenated starch hydrolysates may be present as bulking agents or binders.

A flavoring agent may be present in the chewing gum in an amount within the range of from about 0.1 to about 10.0 weight percent and preferably from about 0.5 to about 3.0 weight percent of the gum. The flavoring agent may comprise essential oils, synthetic flavors, or mixtures thereof including but not limited to oils derived from plants and fruits such as citrus oils, fruit essences, peppermint oil, spearmint oil, clove oil, oil of wintergreen, anise, and the like. Artificial flavoring components are also contemplated for the present invention. Those skilled in the art will recognize that natural and artificial flavoring agents may be combined in any sensorally acceptable blend. All such flavors and flavor blends are contemplated by the present invention.

Optional ingredients such as colors, emulsifiers and pharmaceutical agents may be added to the chewing gum.

In accordance with still yet another embodiment of the present invention, there is contemplated a method of manufacturing a chewing gum containing sucralose. The method comprises adding the sucralose to a mixture of chewing gum ingredients in an amount such that within the initial 2 minutes of chewing, the sucralose releases from the chewing gum at a rate less than about 8 sucrose equivalents per minute. Preferably, the sucralose is added in an amount such that at about 10 minutes of chewing, the sucralose releases from the chewing gum at a rate greater than about 3 sucrose equivalents per minute. More preferably, the sucralose is added to the chewing gum ingredient mixture in an amount sufficient to yield a chewing gum containing greater than about 0.07 weight percent sucralose. Most preferably, the sucralose is added in an amount sufficient to yield about 0.12 weight percent sucralose.

In yet another embodiment of the method of manufacturing of the present invention, sucralose is added to the chewing gum ingredients in an amount to yield a chewing gum containing between about 0.07 and about 0.40 weight percent sucralose.

In general, chewing gum is manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets.

Generally, the ingredients are mixed by first melting the gum base and adding it to the running mixer. The base may also be melted in the mixer itself. Color or emulsifiers may also be added at this time. A softener such as glycerin may then be added next along with syrup and a portion of bulking agent. Further portions of the bulking agent may then be subsequently added to the mixer. A flavoring agent is typically added with the final portion of the bulking agent. The entire mixing procedure typically takes from five to fifteen minutes, but longer mixing times may sometimes be required. Those skilled in the art will recognize that many variations of the above described procedure may be followed.

The fast release sweeteners may be added to the other gum ingredients in any conventional manner known in the art. Preferably, the fast release sweetener is merely mixed with powdered sucralose and the other gum ingredients. The fast release sweetener may be present in any food acceptable quantity. Preferably, the chewing gum formulation contains between about 0.1 and about 10 weight percent high intensity fast release sweeteners or, between about 30 and about 80 weight percent low intensity fast release sweeteners. Those skilled in the art will recognize that the exact amount of fast release sweetener employed will depend on the exact balance of initial sweetness impact and sweetness extension that is desired, the total sweetness desired, the fast release sweetener employed, and other similar factors.

The fast release sweetener may be any compound which is a natural fast release compound, or it may be a compound which has been treated such that it will act as a fast release sweetener during chewing. Treating methods contemplated include encapsulation, co-drying and dissolution of the slow release sweeteners into various solvents including water, alcohols, flavors, and the like. Preferably, since some high intensity sweeteners such as sucralose are slow release sweeteners, these high intensity sweeteners may be treated in accordance with the present invention so that they act as fast release sweeteners during chewing.

According to one embodiment of the present invention, slow release sweeteners may first be dissolved in an alcohol solvent to alter their release characteristics. Preferably, the amount of the slow release sweetener dissolved in the alcohol is sufficient to yield about a 1 to about 20 weight percent solution. More preferably, the slow release sweetener is dissolved in ethanol. The powdered sucralose and the treated slow release sweetener may be added to the chewable gum base in any conventional manner. The slow release sweetener solution may also be blended with a flavoring agent. The solution and flavoring agent may be blended in any manner common to those skilled in the art. Preferably, the slow release sweetener solution is blended with a flavoring agent to yield a sweetener to flavor weight ratio range of about 1:300 to about 1:3. The sweetener in flavor blend may then be added to, or admixed with other gum ingredients in any conventional manner known to those skilled in the art.

A slow release sweetener may also first be dissolved in alcohol and the solution added to the gum as a separate flavor ingredient. Flavor is typically added at any time in the gum manufacturing process. Preferably, flavor is added in the later stages of the mixing process. Further, a slow release sweetener may be dissolved directly inl a solvent comprising a flavoring agent. Once dissolved, the solution can then be added or admixed with other gum ingredients in the same manner as a separate flavor addition.

The release of slow release sweeteners may also be altered by co-drying or encapsulating sucralose with another material. Materials suitable for encapsulation or co-drying contemplated by the present invention include but are not limited to water soluble compounds such as cellulose, cellulose derivatives, starches, proteins, sugars, sugar alcohols, vegetable gums, and the like, and mixtures thereof.

The preferred quantity and type of encapsulating or co-drying material employed may vary depending upon a variety of factors including but not limited to the encapsulating or co-drying method employed, the type of encapsulant or co-drying agent used, and the amount of encapsulant or co-drying agent used.

Those skilled in the art will recognize that various methods of encapsulation and co-drying will alter the slow release sweeteners differently. Thus, slow release sweeteners may be treated by spray drying, granulation, fluidized bed coation, complex coacervation, spray chilling, prilling, extrusion, freezedrying, agglomeration, and other similar techniques.

In accordance with a particularly preferred embodiment it has been found that the form in which sucralose is added to the chewing gum composition apparently affects its release during chewing. For example, when added to the gum manufacturing process in the powder form, sucralose does not appear to release from the chewing gum until about three to about five minutes into chewing. On the other hand, when the rate of release of sucralose is increased, for example, by dissolution in a food acceptable solvent, encapsulation, or co-drying and initial release of sweetness and flavor is experienced almost instantaneously by the consumer upon chewing. Thus, powdered sucralose may be combined with sucralose which has been treated such that it releases from the chewing gum as a fast release sweetener during chewing.

The initial release of sucralose from chewing gum during chewing can be increased by dissolving it in a food acceptable solvent or water. Solvents contemplated include food acceptable organic solvents such as ethanol, propylene glycol, glycerin, glycerol triacetate, vegetable oil, ethyl acetate, triethyl citrate and the like, and combinations thereof. In addition, flavoring agents, individually or as a blend, are suitable solvents. Surprisingly, it has been found that when sucralose is first dissolved in a solvent or water prior to its admixture with other gum constituents, its release from the chewing gum is increased, and a greater initial impact and better balance of flavor and sweetness results. In addition, it was also surprising to discover that a solution comprising a blend of sucralose, alcohol, and flavor apparently gives a greater early intensity of sweetness than when sucralose is added in the normal manner as a powder.

The present embodiment contemplates dissolving sucralose in any food acceptable solvent or water in any acceptable amount. Thus, sucralose may be dissolved in any amount up to its solubility limit or saturation point in the particular solvent employed. Further, additional amounts of sucralose may be dissolved in any particular solvent by increasing the temperature of the solvent thereby increasing the solubility limit.

Thus, sucralose may first be dissolved in ethyl alcohol. Preferably, the amount of sucralose dissolved in the alcohol is sufficient to yield about a 1 to about 15 weight percent solution. The powdered sucralose may be added to and dissolved in the solvent in any conventional manner.

A sucralose solution as described above may also be blended with a flavoring agent in any manner common to those skilled in the art. Preferably, the sucralose solution is blended with a flavoring agent to yield a sucralose to flavor weight ratio range of about 1:300 to about 1:3. A range of about 1:50 to about 1:10 is preferred. The sucralose/ flavor blend may then be added to or admixed with other gum ingredients in any manner known to those skilled in the art for adding flavor to gum.

Sucralose may also first be dissolved in ethyl alcohol and the solution added as a separate ingredient at any time in the gum manufacturing process. It is preferred to add the solution relatively late in the mix to limit evaporation of the solvent.

Further, sucralose may be dissolved directly in a solvent comprising a flavoring agent. In this instance, sucralose may be dissolved in an amount to yield about a 1 to 20 weight percent solution depending of course on maximum solubility limits. Once dissolved, the sucralose in flavor solution can then be added or admixed with other gum ingredients in the same manner as a normal flavor addition.

As already noted, the initial release of sucralose may also be increased by co-drying or encapsulating sucralose with another material. Materials suitable for encapsulation or co-drying contemplated by the present invention include but are not limited to water soluble compounds such as cellulose, cellulose derivatives, starches, proteins, sugars, sugar alcohols, vegetable gums, and the like, and mixtures thereof.

The preferred quantity and type of encapsulating or co-drying material employed may vary depending upon the encapsulating or co-drying method employed, the manner in which the treated sucralose is to be added to the mixture of gum ingredients, and the degree of increase in release rate desired. Further, those skilled in the art will recognize that the degree of modification of the initial release rate of sucralose will vary depending upon a variety of factors including but not limited to the method used, the type of encapsulant or co-drying agent used, and the amount of encapsulant or co-drying agent used. In accordance with the present invention, sucralose in the powdered form may be treated by spray drying, granulation, fluidized bed coating, complex coacervation, spray chilling, prilling, extrusion, freeze drying, agglomeration and other similar techniques.

Sucralose can be controlled to release almost instantaneously upon chewing by spray drying or granulating the powdered sucralose with a compound having a high water solubility such as maltodextrin, hydroxypropylmethylcellulose, gum arabic, carbosymethylcellulose, starches, sugars and sugar alcohols.

It is to be understood that a wide range of changes and modifications to the preferred embodiments described above will be apparent to those skilled in the art. The following examples are not to be construed as a limitation upon the present invention, but are included merely as an illustration of various embodiments.

Examples

Example 1

A chewing gum containing sucralose was prepared in accordance with the expected amounts of the prior art. The chewing gum was prepared by mixing powdered sucralose with the other chewing gum ingredients listed below in a conventional manner at the given proportions.

| Ingredient | Weight Percent |
|---|---|
| Sorbitol | 49.44 |
| Gum Base | 25.43 |
| Mannitol | 7.99 |
| Glycerin | 8.50 |
| Lecithin | 0.21 |
| Lycasin Syrup | 6.83 |
| Color | 0.05 |
| Peppermint | 1.44 |
| Sucralose | 0.066 |

Example 2

A chewing gum containing sucralose was prepared in accordance with the present invention. The chewing gum was prepared by mixing powdered sucralose with other chewing gum ingredients in a conventional manner as in Example 1. The formulation contained the same proportion of ingredients as listed in Example 1 with the exception that the gum contained 0.09 weight percent sucralose. When tested by a panel of experts, the chewing gum formulation of the present example exhibited extended sweetness and flavor release compared to the formulation of Example 1.

Example 3

A chewing gum containing sucralose was prepared in accordance with the present invention. The chewing gum was prepared by mixing powdered sucralose with other chewing gum ingredients in a conventional manner as in Example 1. The formulation contained the same proportion of ingredients as listed in Example 1 with the exception that the gum contained 0.14 weight percent sucralose. When tested by a panel of experts, the chewing gum formulation of the present invention exhibited extended sweetness and flavor release compared to the formulation of Example 1.

Examples 4–9

Chewing gums containing sucralose and six different gum bases were prepared. The chewing gum of Example 4 was prepared in accordance with Example 10 of U.S. Pat. No. 4,435,440 (Hough) except that triacetin was substituted for butyl phthalybutylglycolate and sucralose was substituted for "Compound 3". The chewing gums of Examples 5–9 were prepared by mixing powdered sucralose with other chewing gum ingredients as described in Example 1. The gum base and chewing gum formulations for each example are provided below:

Example 4

|  | % |
|---|---|
| Base | |
| PVAC (polyvinylacetate) | 66.6 |
| Triacetin | 10.0 |
| Elastomer (Polyisobutylene) | 10.0 |
| Wax | 6.7 |
| Filler (Calcium Carbonate) | 6.7 |
|  | 100.0 |
| Gum | |
| Base | 73.01 |
| Dextrose Monohydrate | 24.38 |
| Peppermint Oil | 2.44 |
| Sucralose | 0.17 |
|  | 100.00 |

Example 5

| Base | % |
|---|---|
| PVAC | 15.3 |
| Filler (Calcium Carbonate) | 20.6 |
| Fat/Oil | 13.6 |
| Emulsifier/Softener | 4.7 |
| Wax | 10.0 |
| Elastomer | 16.7 |
| Ester Gum | 19.1 |
| | 100.0 |
| Gum | |
| Base | 20.18 |
| Corn Syrup | 13.30 |
| Glycerin | 1.29 |
| Sugar | 54.34 |
| Dextrose Monohydrate | 9.90 |
| Peppermint Oil | 0.87 |
| Sucralose | 0.12 |
| | 100.00 |

Example 6

| Base | % |
|---|---|
| PVAC | 27.3 |
| Filler | 12.4 |
| Fat/Oil | 3.2 |
| Emulsifier/Softener | 6.2 |
| Wax | 12.4 |
| Elastomer | 12.6 |
| Terpene Resin | 25.9 |
| | 100.0 |
| Gum | |
| Same as Example 5. | |

Example 7

| Base | % |
|---|---|
| PVAC | 26.6 |
| Filler | 9.0 |
| Fat/Oil | 5.8 |
| Wax | 10.1 |
| Elastomer | 8.6 |
| Ester Gum | 11.1 |
| Natural Gum | 28.8 |
| | 100.0 |
| Gum | |
| Same as Example 5. | |

Example 8

| Base | % |
|---|---|
| PVAC | 6.6 |
| Filler | 25.0 |
| Emulsifier/Softener | 5.0 |
| Wax | 25.5 |
| Elastomer | 9.0 |
| Ester Gum | 28.9 |
| | 100.0 |
| Gum | |
| Same as Example 5 | |

Example 9

| Base | % |
|---|---|
| PVAC | 21.7 |
| Filler | 13.3 |
| Fat/Oil | 36.4 |
| Emulsifier/Softener | 2.7 |

Example 9-continued

| | % |
|---|---|
| Elastomer | 25.9 |
| | 100.0 |
| Gum | |
| Same as Example 5 | |

The chewing gum formulations were chewed for specified times after which the cuds were analyzed for remaining sucralose. Table 1 reports the cumulative percent of sucralose released for each product:

TABLE 1

| Time (min.) | Cumulative % Sucralose Release | | | | | |
|---|---|---|---|---|---|---|
| | Ex. 4 | Ex. 5 | Ex. 6 | Ex. 7 | Ex. 8 | Ex. 9 |
| 1 | 14.4 | 9.2 | 10.1 | 2.6 | 0.0 | 14.1 |
| 2 | — | 15.0 | — | — | — | — |
| 3 | 49.5 | 20.0 | 20.3 | 6.8 | 14.2 | 32.5 |
| 6 | — | 35.0 | 26.6 | 27.3 | 34.4 | 64.1 |
| 8 | 63.4 | — | — | — | — | — |
| 12 | 88.7 | 66.7 | — | — | — | — |
| 18 | — | — | 71.9 | 70.9 | 70.6 | 89.2 |
| 24 | — | 85.0 | — | — | — | — |

FIG. 3 plots the data from Table 1. The gums of Examples 4 and 9 showed significantly faster sucralose release than those of Examples 5–8. The chewing gum base of Example 4 contained in large amount of polyvinyl acetate (66.6%) and the chewing gum formulation contained a large amount of base (73.01%). The gum base of Example 9 contained a large amount of fat and oil (36.4%) and a slightly excessive amount of elastomer (25.9%). The gum bases and chewing gum formulations of Examples 5–8 contained ingredients within the preferred composition ranges of the present invention.

FIG. 3 shows the effect different gum base formulations have on the release rate of sucralose. For example, at six minutes, the gums of Examples 5–8 released between 27% to 35% of their sucralose while the gums of Examples 4 and 9 release 58% and 64% respectively.

We claim:

1. A chewing gum composition comprising a mixture of chewing gum ingredients comprising between about 10 and 50 weight percent chewable gum base and an effective amount of sweetener comprising 4,1',6'-trichloro-4,1',6'-trideoxy-galactosucrose (TGS), said composition comprising greater than about 0.07 weight percent TGS and said gum base comprising between about 5 and 40 weight percent polyvinyl acetate, about 7 and 30 weight percent wax, and about 0 and 20 weight percent fats and oils.

2. The chewing gum of claim 1 wherein said TGS is present in an amount such that within the initial 2 minutes of chewing, said TGS releases from said gum at a rate less than about 8 sucrose equivalents per minute, and at about 10 minutes of chewing, said TGS releases from said gum at a rate greater than about 3 sucrose equivalents per minute.

3. The chewing gum of claim 1 wherein said TGS is present in an amount such that at about 15 minutes of chewing, said TGS releases from said gum at a rate greater than about 1.5 sucrose equivalents per minute.

4. The chewing gum of claim 1 comprising between about 0.07 and about 0.40 weight percent TGS.

5. The chewing gum of claim 1 comprising about 0.12 weight percent TGS.

6. The chewing gum of claim 1 further comprising a flavor ingredient.

7. The chewing gum of claim 1 further comprising a bulking agent ingredient.

8. The chewing gum of claim 1 further comprising a softener ingredient.

9. The chewing gum of claim 1 further comprising sorbitol.

10. The chewing gum of claim 1 wherein a portion of the TGS is present in an encapsulated form.

11. The chewing gum of claim 1 wherein a portion of the TGS is present in a co-dryed form.

12. The chewing gum of claim 1 further comprising a fast release sweetener which releases about 60% of its sweetness in the first five minutes of chewing and has a sweetness intensity at least equal to sucrose.

13. The chewing gum of claim 1 further comprising sugar.

14. The chewing gum of claim 1 further comprising aspartame.

15. The chewing gum of claim 1 further comprising xylitol.

16. The chewing gum of claim 1 further comprising saccharin.

17. A method of manufacturing a chewing gum composition containing a mixture of chewing gum ingredients comprising between about 10 and about 50 weight percent of a chewable gum base and an effective amount of sweetener comprising 4,1',6'-trichloro-4,1',6'-trideoxygalactosucrose (TGS), said composition comprising greater than about 0.07 weight percent TGS and said gum base comprising between about 5 and 40 weight percent polyvinyl acetate, about 7 and 30 weight percent wax, and about 0 and 20 weight percent fats and oils, said method comprising mixing said TGS with said chewing gum mixture.

18. The method of claim 17 wherein said TGS is added in an amount sufficient to obtain a chewing gum composition having between about 0.07 and about 0.40 weight percent TGS.

19. The method of claim 17 wherein said TGS is added in an amount sufficient to obtain a chewing gum composition having about 0.12 weight percent TGS.

20. The method of claim 17 wherein a portion of the TGS is encapsulated prior to mixing with the chewing gum mixture.

21. The method of claim 17 wherein a portion of the TGS is co-dryed prior to mixing with the chewing gum mixture.

22. The method of claim 17 wherein a portion of the TGS is dissolved in a food acceptable solvent or water prior to mixing with the chewing gum mixture.

23. The method of claim 17 wherein a portion of the TGS is dissolved in a food acceptable solvent or water and then blended with a liquid flavor prior to mixing with the chewing gum mixture.

24. The method of claim 17 wherein a portion of the TGS is dissolved in a liquid flavor prior to mixing with the chewing gum mixture.

* * * * *

UNITED STATES PATENT AND TRADEMARK OFFICE
CERTIFICATE OF CORRECTION

PATENT NO. : 4,986,991
DATED : January 22, 1991
INVENTOR(S) : Robert Yatka et al.

Page 1 of 3

It is certified that error appears in the above-identified patent and that said Letters Patent is hereby corrected as shown below:

TITLE PAGE

On page 1, column 1, after "Assignee:", please delete "Wm" and substitute therefor --Wm.--

IN OTHER PUBLICATIONS

On page 1, column 2, in the second listed publication, please delete "sweetner" and substitute therefor --sweetener--.

IN THE BACKGROUND OF THE INVENTION

In column 1, line 38, please delete "from" and substitute therefor --form--.

IN THE SUMMARY OF THE INVENTION

In column 2, line 10, please delete "sweetner" and substitute therefor --sweetener--.

In column 2, line 29, please delete "sweetner" and substitute therefor --sweetener--.

In column 2, line 43, please delete "lest" and substitute therefor --least--.

In column 2, line 67, please delete "sweetner" and substitute therefor --sweetener--.

UNITED STATES PATENT AND TRADEMARK OFFICE
CERTIFICATE OF CORRECTION

PATENT NO. : 4,986,991
DATED : January 22, 1991
INVENTOR(S) : Robert Yatka et al.

It is certified that error appears in the above-identified patent and that said Letters Patent is hereby corrected as shown below:

In column 3, line 1, before "increased" please delete "a" and substitute therefor --an--.

In column 3, line 10, please delete "sweetner" and substitute therefor --sweetener--.

In column 3, line 24, please delete "sweetner" and substitute therefor --sweetener--.

In column 3, line 34, please delete "based" and substitute therefor --base--.

IN THE DETAILED DESCRIPTION OF
PRESENTLY PREFERRED EMBODIMENTS

In column 6, line 1, please delete "are" and substitute therefor --is--.

In column 6, line 14, please delete "sWeetness" and substitute therefor --sweetness--.

In column 8, line 24, before "chicle" please delete "a" and substitute therefor --as--.

In column 8, line 30, please delete "coca" and substitute therefor --cocoa--.

In column 8, line 33, please delete "carnuba" and substitute therefor --carnauba--.

UNITED STATES PATENT AND TRADEMARK OFFICE
CERTIFICATE OF CORRECTION

PATENT NO. : 4,986,991
DATED : January 22, 1991
INVENTOR(S) : Robert Yatka et al.

It is certified that error appears in the above-identified patent and that said Letters Patent is hereby corrected as shown below:

In column 10, line 12, please delete "ydrogenated" and substitute therefor --hydrogenated--.

In column 11, line 61, please delete "inl" and substitute therefor --in--.

In column 13, line 51, please delete "carbosymethylcellulose" and substitute therefor --carboxymethylcellulose--.

Signed and Sealed this

Twenty-seventh Day of April, 1993

*Attest:*

MICHAEL K. KIRK

*Attesting Officer*   Acting Commissioner of Patents and Trademarks